United States Patent [19]
Latos et al.

[11] Patent Number: 5,899,411
[45] Date of Patent: May 4, 1999

[54] AIRCRAFT ELECTRICAL SYSTEM PROVIDING EMERGENCY POWER AND ELECTRIC STARTING OF PROPULSION ENGINES

[75] Inventors: Thomas S. Latos, Huntley; Jeffrey D. Nelson, Belvidere; Gary E. Dickes, Caledonia, all of Ill.

[73] Assignee: Sundstrand Corporation, Rockford, Ill.

[21] Appl. No.: 08/589,235

[22] Filed: Jan. 22, 1996

[51] Int. Cl.⁶ .................................................. B64D 33/00
[52] U.S. Cl. ............................. 244/53 A; 244/58; 290/44; 60/39.142
[58] Field of Search .................................. 244/53 A, 58; 290/55, 44; 60/39.142, 39.141, 39.15

[56] References Cited

U.S. PATENT DOCUMENTS

| | | |
|---|---|---|
| 2,402,547 | 6/1946 | Gilfillan . |
| 2,723,531 | 11/1955 | Wosika et al. .............................. 244/58 |
| 4,477,040 | 10/1984 | Karanik ..................................... 244/58 |
| 4,697,090 | 9/1987 | Baker et al. . |
| 4,700,081 | 10/1987 | Kos et al. .................................. 290/44 |
| 4,917,332 | 4/1990 | Patterson, Jr. ............................. 244/58 |
| 4,992,721 | 2/1991 | Latos ........................................ 322/10 |
| 5,047,699 | 9/1991 | Rozman et al. . |
| 5,083,039 | 1/1992 | Richardson et al. ...................... 290/44 |
| 5,097,195 | 3/1992 | Raad et al. . |
| 5,150,859 | 9/1992 | Ransick ..................................... 244/58 |
| 5,428,275 | 6/1995 | Carr et al. ................................. 318/146 |
| 5,512,811 | 4/1996 | Latos et al. . |

OTHER PUBLICATIONS

SAE Technical Paper 932559 "System Design Considerations for an APU Starter Generator".

U.S. application No. 08/1553180/B04962, Althof et al., filed Nov. 7, 1995.

*Primary Examiner*—Charles T. Jordan
*Assistant Examiner*—Tien Dinh
*Attorney, Agent, or Firm*—Lawrence E. Crowe

[57] ABSTRACT

An aircraft is provided that includes one or more engines, an air-driven generator, and a start-circuit for operably connecting an electrical output of the air driven generator for starting one or more of the engines while the aircraft is in flight. Various embodiments also provide apparatus for cross-ship electric starting of multiple engines while the aircraft is in flight or on the ground using: an electrical output of a generator attached to another engine; on-board batteries; an on board auxiliary power unit; or power received from a ground source. A single start-converter is utilized to supply power to AC starter-motors for electric starting of the aircraft's engines. In some embodiments, the engine is soft-started with the air driven generator, by controlling blade pitch in an air driven turbine driving the air driven generator, without the use of the start converter.

12 Claims, 5 Drawing Sheets

AIRCRAFT ELECTRICAL SYSTEM PROVIDING EMERGENCY POWER AND ELECTRIC STARTING OF PROPULSION ENGINES

FIELD OF THE INVENTION

This invention relates to aircraft in general, and more particularly to an aircraft electrical system that utilizes an air driven generator to provide: in-flight electric starting of propulsion engines; and emergency power to critical flight control systems of the aircraft during attempts to re-start the propulsion engines while the aircraft is in flight. The aircraft electrical system of this invention also provides the capability for electrically starting multiple engines with a single start converter, when the aircraft is either in flight or on the ground.

BACKGROUND

Government regulations promulgated by organizations such as the FAA in the United States and the JAA in Europe require that an aircraft carrying commercial passengers have the capability to re-start the propulsion engine(s) while the aircraft is in flight. For safety reasons, these regulations also typically require that redundancy be built into the in-flight engine start systems of such passenger carrying aircraft so that a single-point failure cannot entirely eliminate the ability to attempt an in-flight re-start of the propulsion engine(s). The regulations further require that the engine start system be capable of providing enough power for at least three attempts to re-start the propulsion engine(s) while the aircraft is in flight. Most military aircraft are also required to provide means for in-flight re-starting of the propulsion engines.

There are two important aspects to providing in-flight re-start of the propulsion engines: 1) providing a power source for spin-up of the engine to a speed at which an engine start can be accomplished; and 2) providing power for critical flight control systems so that the aircraft can continue to fly in a safe, controlled manner during the re-start attempts.

In the past, aircraft manufacturers have utilized a variety of approaches to provide power for in-flight engine re-start and flight control, in a manner that complies with the government regulations outlined above. The particular approach selected for a given aircraft is highly dependent upon the size of the aircraft, and upon the specific type of engine utilized for propulsion.

In small commuter aircraft, carrying only a few passengers, flight control has typically been provided by mechanical cable-and-pulley systems. With these cable-and-pulley systems, the pilot's muscles provide all of the input power required to operate the flight control system, even when the engine is inoperative. Therefore, only the problem of providing power for spin-up of the engine to a speed at which a successful start can be accomplished during flight need be resolved. In small aircraft this power is typically provided by a 12 or 28 volt DC electrical system having a DC start motor operably connected to spin-up the engine when supplied with power from on-board batteries. Such a start system is very similar to those used for starting an automobile engine. To provide redundancy and sufficient capacity for three start attempts, independent redundant backup electrical circuits are utilized, and additional battery capacity is provided.

For intermediate sized commercial aircraft in the 50 seat range, however, and for certain single or multiple seat military aircraft, the simple 28 volt start systems used in small aircraft are not a viable solution to the problem of providing in-flight engine re-start capability. Intermediate sized aircraft typically use turboprop or turbofan engines which require such a large amount of power for spin-up that it is impractical to carry enough on-board battery capacity and large enough DC start motors to meet the applicable regulations. Also, these intermediate sized aircraft often utilize hydraulically or electrically powered flight controls, rather than the cable-and-pulley systems used in small aircraft. Such hydraulically and electrically powered flight controls must have a power source independent from pumps or generators driven by the propulsion engines in order to maintain control of the aircraft during an all-engines-out re-start attempt in flight.

Such intermediate sized aircraft typically utilize air-turbine starters for in-flight re-start, in combination with placing the aircraft in a steep dive, thereby forcing air through the engine core, to spin the engine up to starting speed. To meet the redundancy requirements, multi-engined aircraft are typically equipped with pneumatic ducting systems that allow cross-ship starting of either engine, using engine bleed air supplied by the opposite engine as a source of pneumatic power for the air turbine starter. For a two-engine-out scenario on a multi-engined aircraft, or for starting a single engine aircraft, air is supplied to the air turbine starter from a pressurized storage bottle, or from an on-board auxiliary power unit (APU).

At the upper end of the intermediate sized class of aircraft, the option of having a pressurized air bottle large enough to provide three start attempts becomes impractical, forcing the need for an on-board APU. The need for having an APU to supply a backup source of pressurized air for the air turbine starters to meet redundancy requirements in the all-engines-out scenario makes the APU flight-critical and places it on the Master Minimum Equipment List (MMEL) for the aircraft. Having the APU listed on the MMEL has a significant detrimental effect on the operation of a commercial aircraft, because government regulations forbid an aircraft from taking off with any equipment that is listed on the MMEL in an inoperative condition. Although APUs are reasonably reliable machines, aircraft operators would prefer that the APU not be required in order to meet the redundancy requirements for in-flight engine re-start, because an APU problem can lead to delays or cancellation of flights. Were it not for the APU being on the MMEL to provide in-flight re-start, an inoperative APU would not seriously impact aircraft operation, or cause flight delays in most instances, because other functions normally provided by the APU, such as providing electrical or pneumatic power while the aircraft is taxiing or parked at gate, can alternatively be provided by a ground cart, a main engine, or simply eliminated without seriously impacting aircraft flight operations.

Furthermore, in aircraft propelled by modern high-bypass engines, it is difficult to force enough air through the engine core to spin the engine up to start speed by placing the aircraft in a steep dive, as was done with prior aircraft utilizing older types of propulsion engines. In some instances the dive angle required would be so steep that it would fall outside of the safe operating envelope of the aircraft.

Large aircraft generally utilize large turboprop or turbofan engines, and hydraulically or electrically powered flight controls. The problems associated with in-flight re-start of the propulsion engines in large aircraft are therefore generally analogous to the problems encountered in intermediate sized aircraft as described above.

To eliminate the potential problems and operational limitations associated with the use of air-turbine starters for turboprop and turbofan engines, electric start with AC starter motors has been considered, but heretofore has not provided a practical alternative. By using AC, motors instead of the DC motors used on smaller aircraft, the starter motors can be made small and lightweight enough to make an AC start system potentially feasible for aircraft use. Such AC start systems have not typically been utilized, however, because they require a power electronics based converter to convert battery power to AC power for the motor, and to provide control of the AC motor. In order to meet the redundancy requirements for in-flight re-start it was previously thought that applicable regulations would require an aircraft to carry multiple converters, with at least one converter being required for each engine. It was also believed that the aircraft would need to carry enough battery capacity to meet the three start attempt requirement. The need for such multiple converters and additional battery capacity to meet applicable regulations imposed such large cost, weight, volume, and reduced reliability penalties on the use of prior AC start systems that they were not perceived as viable alternatives to start systems using air turbine starters.

Both large and intermediate sized aircraft typically carry an air-driven emergency power plant, in the form of a ram air driven turbine (RAT), which can be deployed to supply hydraulic or electrical power to certain critical flight control systems in the event of a loss of power from all propulsion engines and the APU. In future aircraft, this emergency power function may alternatively be provided by an air driven turbine in the form of a vortex turbine as described in U.S. Pat. No. 4,917,332 to Patterson or U.S. Pat. No. 5,150,859 to Ransick. Prior air driven emergency power units have generally been small in size and limited in power output to minimize their parasitic weight and volume impact on the aircraft. Their use has been limited to providing a relatively small amount of emergency power for certain critical flight control systems, and they have not previously been utilized to provide power for in-flight electric re-start of propulsion engines. This was logical, since the air driven generator spent the majority of its life as essentially "excess baggage" riding in a stowage compartment of the aircraft, and was therefore made as small as possible. Air driven generators are generally simpler in construction than APUs, however, and thus are inherently more reliable.

An object of our invention, therefore, is to provide an aircraft having an improved engine start system meeting the applicable requirements for in-flight re-start of the aircraft's propulsion engine(s). Other objects include providing:

1) an aircraft start system which can also start the propulsion engine(s) with the aircraft on the ground;

2) an aircraft start system which does not require that on-board APU be listed on the MMEL;

3) an aircraft start system which does not require an APU;

4) an aircraft start system which is compatible with existing aircraft electrical systems;

5) an aircraft start system utilizing an AC electric start motor;

6) an aircraft start system providing a single start converter for starting multiple engines; and 7) an engine start system meeting applicable FM and JAA, etc., regulations relating to in-flight re-start of propulsion engines.

SUMMARY OF THE INVENTION

Our invention provides an aircraft having an engine start system meeting the objects stated above by utilizing an air driven generator to supply electric power for in-flight re-start of the propulsion engine(s). Specifically, our invention provides an aircraft including one or more propulsion and/or non-propulsion engines, an air driven generator, and means for operably connecting an electrical output of the air driven generator to the engines for starting the engines. Various embodiments of our invention also provide means for cross-ship electric starting of multiple engines while the aircraft is in flight or on the ground using: an electrical output of a generator attached to another engine; on-board batteries; an on-board APU; or power received from a ground power source.

The electrical system of our invention is therefore readily adaptable for use in a variety of single and multiple engine aircraft of small, intermediate, and large size. For example, by adding an air driven generator in a form such as a ram air turbine or a vortex turbine, and means for connecting an electrical output of the air driven turbine to the starter motor of the engine, our invention may be readily adapted for use in a small single engine aircraft. In intermediate or large aircraft that currently carry an air driven turbine for providing emergency power to control surfaces, and utilize air turbine starters for in-flight re-starting of single or multiple engines, the practice of our invention requires replacement of the air turbine starter motors with AC starter motors, increasing the size of the generator on the air driven turbine to provide sufficient power for both the control surfaces and for engine starting, and reconfiguring the electrical system of the aircraft to provide means for connecting the output of the ram air driven turbine to the AC starter motor of the engine for in-flight re-starting.

In contrast to prior aircraft electrical systems utilizing AC starter motors which required a start converter for each engine, our invention provides an electric-power/engine-start-system which requires only a single start converter, thereby significantly reducing the complexity, cost, size, and weight of the engine starting system. By using AC starter motors driven by electric power produced by an air driven generator, instead of air turbine engine starters which require the output of an on board APU for in-flight re-starting, all embodiments of our invention allow removal of the APU from the MMEL. Because the air driven generator and start system of our invention is less complex than the air turbine motor/APU based systems previously utilized, the electrical system of our invention provides significant advantage to aircraft operators by reducing the risk of cancelled flights and down-time for maintenance experienced with prior aircraft in which the APU was required to be on the MMEL.

In some embodiments of our invention, the speed of the air driven generator is controlled in a manner that allows "soft-starting" of the engines. Specifically, the air driven turbine which drives the air driven generator (ADG) includes a blade pitch control mechanism which controls the speed of the ADG by adjusting the pitch of the blades. By controlling the speed of the generator, the output frequency is also controlled.

Our invention further contemplates a method for starting an engine of an aircraft while the aircraft is in flight, for an aircraft including an engine for propelling the aircraft along a flight path, an electric starter motor operably attached to the engine for driving the engine, and an air driven generator for extracting energy from a flow of air passed the aircraft while it is in flight and converting the extracted energy into electrical power. The method for starting the engine while the aircraft is in flight includes the steps of: electrically connecting the air driven generator to supply electrical power to the starter motor for driving the engine; accelerating the engine to a pre-determined start-speed; and supplying fuel and a source of ignition to the engine while the starter motor is driving the engine at start-speed.

Other objects, advantages and novel features of our invention will be readily apparent upon consideration of the following drawing and detailed descriptions of preferred embodiments.

DESCRIPTION OF PREFERRED EMBODIMENTS

Figure 1:
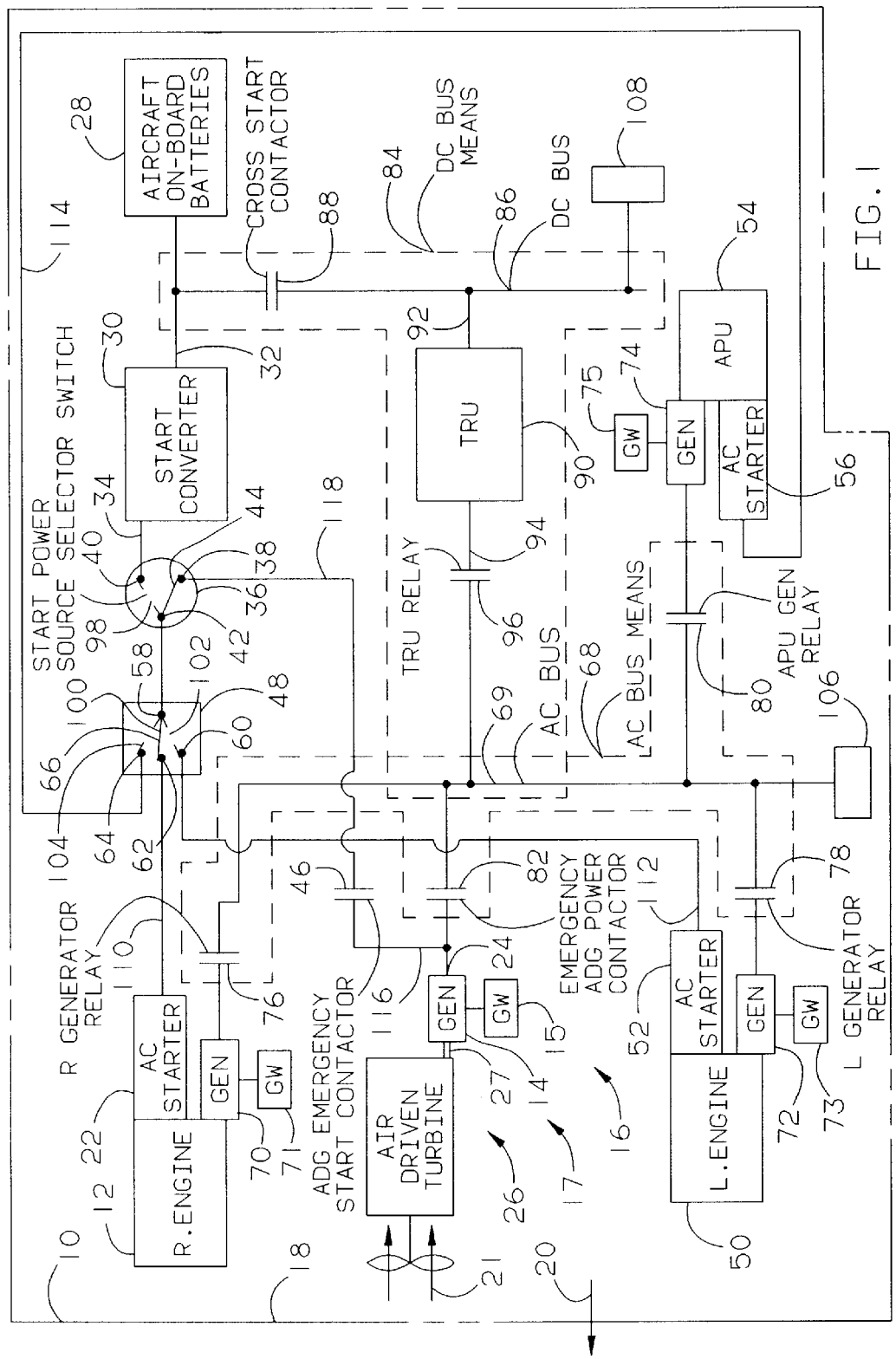
FIG. 1 is a schematic illustration of a multiple engine aircraft and electrical system according to our invention.

FIG. 1 depicts an exemplary embodiment of an aircraft 10 according to our invention. The aircraft 10 includes an air-frame 18 having attached thereto a first and a second propulsion engine 12, 50 respectively labeled herein as the right and left propulsion engines 12, 50. The propulsion engines 12, 50 provide power for propelling the aircraft 10 along a flight path 20.

A third engine in the form of an auxiliary power unit (APU) 54 is also attached to the airframe 18. The APU 54 is a non-propulsion engine used to supply on-board emergency or auxiliary electrical power while the aircraft 10 is in flight, or when the aircraft 10 is on the ground with one or both of the propulsion engines 12, 50 not operating. As used herein, the term "non-propulsion engine" includes any engine carried aboard the aircraft 10 which does not produce thrust, either directly, or indirectly through a propeller, etc., for propelling the aircraft along the flight path.

The aircraft 10 also includes an air driven turbine 26 attached to the airframe 18 in such a manner that as the aircraft 10 traverses the flightpath 20, air flowing past the aircraft 10 is converted by the air driven turbine 26 into a rotary output 27 of the air driven turbine 26. The air driven turbine 26 may be any type of deployable or permanently deployed device for converting a flow of air 21 into the rotary output 27. Suitable air driven devices include ram air driven turbines and vortex turbines of the type currently in use on aircraft or known to aircraft designers.

The aircraft 10 further includes an electrical system 16 having an air driven electrical generator 14 operably coupled to the output 27 of the air driven turbine 26. The air driven generator converts rotary mechanical power received from the rotary output 27 into electrical power at an electrical output 24 of the air driven generator 14.

The electrical system 16 further includes engine-start circuit means 17 for operably connecting the electrical output 24 of the air driven generator 14 to any of the engines 12, 50, 54 for starting those engines. Specifically the engine-start circuit means includes a generator control unit (ADG GCU) 15 connected to control the electrical output 24 of the air driven generator 14, and a starter motor 22, 52, 56 attached respectively to each of the right, left, and APU engines 12, 50, 54. Each of the starter motors 22, 52, 56 are respectively connected via cable means 110, 112, 114, to a first, second and third output terminal 62, 60, 64 of an engine selector switch 48. The engine selector switch 48 also includes an input 102 adapted to receive electric power, and switching means 66 for electrically connecting the input 102 of the engine selector switch 48 to one of the first, second, or third outputs 62, 60, 64 of the engine selector switch 48.

The engine start-circuit means 17 also includes a start power source selection switch 36 having an output 42 electrically connected to the input 52 of the engine selector switch 48. The source selection switch 36 also includes a first and second input 38, 40 adapted to receive electric power, and a switching means 44 for selectively electrically connecting the output 42 of the start power source selection switch 36 to either of the first or the second input 38, 40 of the source power selection switch 36.

The engine start-circuit means 17 further includes an emergency start contactor 46 electrically connected in a series relationship by cables 116, 118 respectively to the output 24 of the air driven generator 14 and the first input 38 of the start-power source selection switch 36.

In the embodiment of our invention depicted in FIG. 1, therefore, the engine start-circuit means 17 includes: the air driven generator GCU 15; the starter motors 22, 52, 56 respectively attached to each of the engines 12, 50, 54; the emergency start contactor 46; the start power source selector switch 36; the engine selector switch 48; and the interconnecting cables 110–118. Those skilled in the art will readily recognize that through appropriate positioning of the switching means 66, 44 of the engine selector and the source selector switches 48, 36, and by closing the emergency power contactor 46, electrical power produced by the air driven generator 14 may be selectively routed alternatively to any of the starter motors 22, 52, 56 for starting the right, left, or APU engines 12, 50, 54 respectively. We wish to specifically point out, however, that the particular start-circuit means described above is but one example of an essentially unlimited number of alternate embodiments of the start-circuit means according to our invention. For instance, in other types of aircraft having simpler electrical systems, it may be preferable to eliminate the start-power source selection switch 36 and/or the emergency start contactor 46. In a single engine aircraft, the engine selector switch 48 could obviously be eliminated within the scope of our invention.

In order to provide means for starting the engines 12, 50, 54 while the aircraft 10 is on the ground, and as a back up to the air driven generator 14 when the aircraft is in flight, the electrical system 16 of the exemplary embodiment of FIG. 1 further includes on-board batteries 28 and a single start convertor 30. The start convert 30 allows the use of AC starter motors 22, 52, 54 for starting the engines 12, 50,54 rather than DC motors which tend to be significantly heaver than AC motors for a given power output. The starter motors 22, 52, 56 may be any of a number of common AC motor constructions including, induction motors, brushless-DC motors, or switched-reluctance motors.

The start converter 30 is configured to convert DC power received at an input 32 of the converter 30 into AC power delivered at an output terminal 34 of the converter 30. The input and output 32, 34 are respectively electrically connected to the batteries 28 and the second input terminal 40 of the start-power source selection switch 36. By selectively positioning the switching means 44 of the source selection switch to electrically connect the second input to the output 40, 42 of the source selection switch 48, the converter 30 may be utilized as an alternate source of electrical power for the engine start-circuit means 17. The capability for starting multiple engines using AC motors and a single converter in an electrical system 16 according to our invention provides significant cost, weight, and reliability advantages in comparison to prior attempts to utilize AC motors for electric engine starting in electrical systems which required multiple converters, or one converter for each engine.

The right, left, and APU engines 12, 50, 54 are respectively operably connected to drive a right, left and APU generator 70, 72, 74 of the electric power system 16 for producing alternating current. Each of the right, left, and APU generators 70, 72, 74 are respectively connected to a left, a right, and an APU generator control unit 73, 71, 75 to be controlled thereby. The electric system 16 of the aircraft 10 of the exemplary embodiment further includes AC bus means 68 for providing alternating current to equipment, such as flight control actuators, (not shown) of the aircraft 10. The AC bus means 68 includes a right, left, and APU generator relay 76, 78, 80, for selectively and respectively connecting alternating current received from the right generator 70, left generator 72, or APU generator 74 to the AC bus 69. The AC bus means 68 further includes an emergency power contactor 82 for connecting power produced by the air driven generator 14 to the AC bus 69.

The aircraft 10 of the exemplary embodiment depicted in FIG. 1 further includes DC bus means 84 including a DC bus 86, a cross-start contactor 88 for connecting the DC bus 86 to the battery 28, and a transformer rectifier unit (TRU) 90. The TRU 90 includes an electrical output 92 connected to the DC bus 86, and an input 94 adapted to receive alternating current. The TRU 90 is configured to supply DC power to the DC bus 86 when AC power is supplied to the input 94 of the TRU 90. A TRU relay 96, disposed in a series circuit relationship between the AC bus 69 and the TRU 90, provides a means for selectively electrically connecting the input 94 of the TRU 90 to the AC bus 69.

ENGINE START USING ONBOARD BATTERY POWER

Our invention allows any of the engines 12, 50, 54 to be conveniently started sing power supplied by the onboard batteries 28. For example, to start the right engine 12, the switching means 44, 66 of the start power source selection switch 36 and engine elector switch 48 are positioned to create an electrical circuit for conducting DC power received from the batteries 28 sequentially through the start converter 30, the start power selection switch 36, and the engine selector switch 48 to the AC starter motor 22 of the right engine 12. DC power received at the input 32 of the start converter 30 from the batteries 28 is converted by the start converter 30 into AC power at the output terminal 34 of the start converter 30. The switching means 44 of the start power source selection switch 36 are positioned as indicated at 98 to conduct the AC power received at the second input terminal 40 of the start power selection switch 36 from the start converter 30 to the output terminal 42 of the start power source selection switch 36. The switching means 66 of the engine selector switch 48 are positioned as indicated at 100 to conduct power received from output terminal 42 by the input 58 of the engine selector switch 48 to the first output 62 of the engine selector switch 48, thereby providing an electrical connection to the starter motor 22 of the right engine 12. With the starter motor 22 thus connected via the start converter 30 to the battery 28, the start converter 30 and starter motor 22 will drive the right engine, 12 up to a predetermined start-speed at which an engine start may be achieved. When the right engine 12 has accelerated to the start speed, the engine 12 is supplied with fuel and a source of ignition while the starter motor 22 continues driving the engine 12 to achieve an engine start. Once the right engine 12 has started it will accelerate toward a pre-determined operating speed of the engine. At a pre-determined disengagement speed, between the start and operating speeds, power supplied by the converter 30 to the starter motor 22 will be cut off and the engine 12 will accelerate to operating speed under its own power. The starter converter 30 of the exemplary embodiment illustrated in FIG. 1 includes internal circuitry (not shown) for controlling the starter motor 22 in a manner causing the motor 22 to produce accelerating torque, and for sensing when the disengagement speed has been reached. Speed sensing and control of the starter motor can be accomplished by a number of sensing methods, and/or mechanisms well know to those skilled in the art.

Once the right engine 12 is started, the process described above can be similarly repeated to start the left and APU engines 50, 54 by simply moving the switching means 66 of the engine selector switch respectively to the positions indicated at 102 and 104. However, if the remaining engines 50, 54 are started in the same manner, the battery 28 would need to be large in order to supply enough energy to start all of the engines.

CROSS SHIP ENGINE STARTING

Although the right, left and APU engines 12, 50, 54 can be started sequentially in any order using battery power as described in the preceding section, it will generally be preferable to utilize one of the engines 12, 50, 54 for starting the other engines once the first engine has reached operating speed, in order to conserve the power stored in the batteries 28. Furthermore, once one of the engines has reached operating speed, it will be desirable to use the output of the generator attached to and powered by that engine to provide power to the TRU 90 for recharging the aircraft batteries 28. The electrical system 16 of our invention allows cross starting of the engines 12, 50, 54 and recharging of the batteries 28 to be accomplished in a relatively straightforward manner once any of the engines 12, 50, 54 has reached operating speed.

For instance, once the right engine 12 has reached operating speed, the right generator relay 76, the TRU relay 96, and the cross start contactor 88 may all be closed to provide a path for a flow of current: from the right generator 70 through the right generator relay 76 to the AC bus 69; through AC bus 69 and the TRU relay 96, to the TRU 90; and then through the cross start contactor 88 to the onboard batteries 28 and/or the input 32 of the start converter 30. The switching means 66 of the engine selector switch 48 may then be moved to the position indicated at 102, for instance, to direct power from the starter converter 30 to the starter motor 52 operably attached to spin-up the left engine 50. The starter motor 52 accelerates the left engine 50 to a predetermined start speed at which a successful start may be achieved by supplying the engine with a source of fuel and ignition. The left engine 50 will then accelerate under its own power toward a pre-determined operating speed of the engine 50. At a pre-determined disconnect speed between the start speed and the operating speed of the left engine 50, the start converter 30 will sense that the disconnect speed for the starter motor 52 has been reached and the start converter 30 will cut off the AC power supplied to the starter 52. Once the left engine has achieved its pre-determined operating speed, the left generator relay 78 may also be closed to connect the right generator 70 to the AC bus 69 of the aircraft.

The APU engine 54 may be started in similar fashion by moving the switching means 66 of the engine selector switch to the position indicated at 104 such that the start converter 30 will provide power to the starter motor 56. Once the APU engine 54 has achieved its normal operating speed, the APU generator relay 80 may be closed to couple the APU generator 74 to the aircraft bus 69 such that the APU generator 74 may supply alternating current to the AC bus 69.

With any of the engines 12, 50, 54 of the exemplary embodiment running at operating speed and their respective generator relays 76, 78, 80 closed, the AC bus 69 will provide a source of alternating current to the TRU 90 via the TRU relay 96. The TRU will convert the alternating current received from the AC bus 69 at the input 94 of the TRU 90 into direct current supplied to the DC bus 86 at the output 92 of the TRU. The direct current in the DC bus 86 is coupled to the aircraft battery 28, or to the input 32 of the start converter 30 via the cross-start contactor 88 so that the power being produced by the generator attached to the engine 12, 50, 54 which is running may be used for cross starting the remaining engines 12, 50, 54, while simultaneously charging the aircraft batteries 28, thus precluding further discharge of the batteries 28 for the purpose of starting the remaining engines 12, 50, 54. Those skilled in the art will recognize, that an aircraft having an electrical system according to our invention requires only a single start converter 30 to provide multiple attempts at starting multiple engines 12, 50, 54 in contrast to prior AC start motor driven systems which required at least one converter per engine.

IN FLIGHT STARTING WITH THE AIR DRIVEN GENERATOR

Another central feature of our invention is the ability to start any of the engines 12, 50, 54 while the aircraft 10 is in flight, using only electric power provided by the air driven generator 14, rather than the onboard batteries 28 or the APU 54. For instance, in an all- engines-out flight scenario, the right engine 12 may be started by deploying the air driven turbine 26 to drive the air driven generator 14, and utilizing the engine start circuit means 17 of our invention for operably connecting an electrical output 24 of the air driven generator 14 to the start motor 22 for starting the right engine 12. Specifically, to achieve such a start, the emergency start contactor 46 is closed to provide electric power from the output 24 of the air driven generator 14 to the first input 38 of the start power selection switch 36. The switching means 44 of the start power source selection switch are positioned as shown in solid lines on the drawing to provide a current path from the first input 38 of the source selection switch 36 to the output 42 of the source selection of the start power source selection switch 36. The engine selector switch 48 is positioned as shown in solid lines at 100 in the drawing to provide a path for current from the output 42 of the start power selection switch 36 through the input 58 of the engine selector switch and the first output 62 of the engine selector switch to the starter motor 22 of the right engine 12. With the engine start-circuit means 17 thus configured, the air 21 flowing past the airframe 18 through the air driven turbine 26 will drive the air driven generator 14 to produce a flow of alternating current through the engine start-circuit means 17 for driving the AC starter motor 22 of the engine 12. The starter 22 will drive the right engine 12 up to a start speed at which the engine 12 can be started in a manner similar to that described above with regard to engine starting using the batteries 28 or in cross ship starting.

The left engine 50 and/or the APU engine 54 may be similarly started by positioning the engine selector switch respectively in the position indicated at 102 and 104 in the drawing. Alternatively, and preferably, once one of the engines 12, 50, 54 is started, the output of that engine may be used for cross starting either of the remaining engines in a manner similar to that described above.

ENGINE START UTILIZING GROUND POWER

As indicated at 106 and 108 in the drawing, an aircraft 10 according to our invention may also be started utilizing AC power received through an AC ground power connection 106 electrically connected to the AC bus 69, or by utilizing DC power received through a DC ground power connection 108 connected to the DC bus 86.

SOFT-START USING THE CONVERTER

In preferred embodiments of our invention, the electrical circuit 16 is configured to allow use of the converter 30 for soft-starting the engines 12, 50, 54, according to methods known in the art, to thereby reduce the size of the converter 30 and starter motors 22, 52, 56. The term soft-start as used herein refers to any process whereby the output voltage and frequency of the converter 30 are applied to the motor 22, in a controlled manner as a function of motor speed or motor rotor position, to substantially reduce inrush currents that would otherwise occur during motor start.

Figure 2:
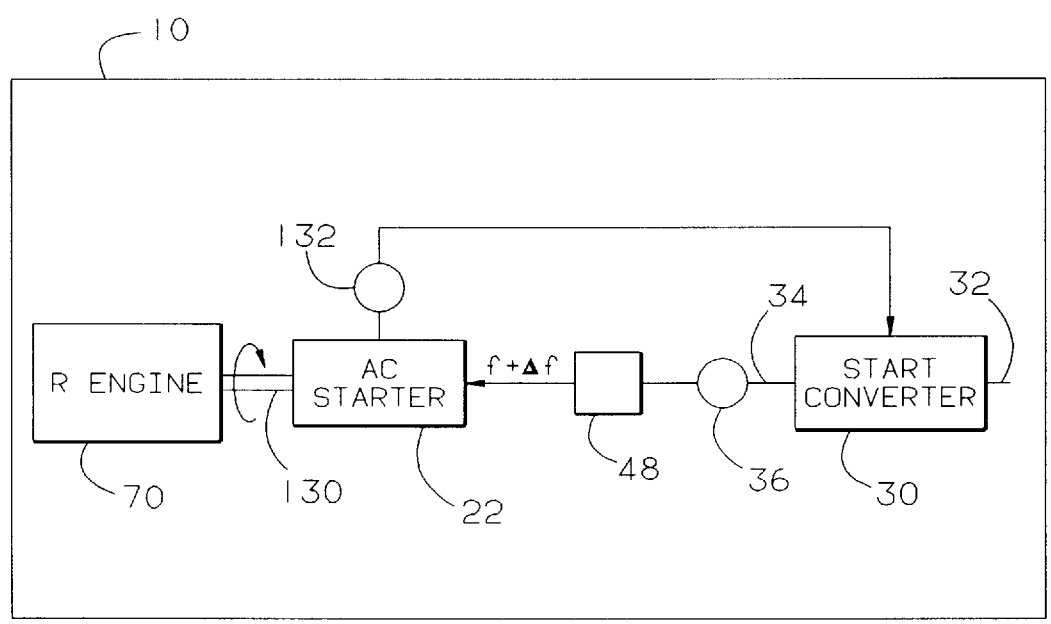
FIG. 2 is a schematic illustration of a portion of the electrical system of FIG. 1 depicting a method of providing a soft-start of an engine utilizing the start converter of our invention.

For example, as shown in FIG. 2, where the starter motor 22 is an AC induction motor, the start converter 30 monitors position and speed of the motor rotor 130, and controls the frequency and voltage of output power applied to the motor 22 from the output terminals 34 of the start converter 30. The position and speed signals may be sensed or estimated in any manner known in the art by circuitry within the converter 30, or by a device such as the resolver 132 depicted in FIG. 2.

The converter 30 generates an output power signal to the induction motor 22 having a frequency proportional to the sensed speed of the rotor 130, plus an incremental frequency ($\Delta f$) required to induce a flow of excitation current in the rotor 130 and to produce an accelerating torque. The output voltage of the converter 30 is also controlled to provide power to the motor 22 at a constant voltage-to-frequency ratio. By controlling both output frequency and voltage from the converter 30, the motor 22 accelerates the engine 12 in a controlled fashion, and inrush currents are greatly reduced in comparison to a line start wherein the motor 22 is simply connected directly to an AC source of fixed frequency and voltage.

It will be recognized that because the starter motor 22 is connected to drive the engine 12, either directly or through a gear train (not shown), the speed of the rotor 130 is directly proportional to the engine speed $\omega$. The embodiment of the invention described with reference to FIG. 2 is capable of starting the engine 12 from any speed $\omega$, including from rest, while the aircraft 10 is in flight or on the ground.

Those having skill in the art will recognize that the details of how a soft-start are achieved will depend upon the type of starter motor 22 being utilized. For instance, if a synchronous motor is utilized rather than the induction motor described above, the method of control would be different. Specifically, the converter 30 would control output frequency to be directly proportional to the engine speed $\omega$, and control torque by controlling the torque angle and starter current amplitude in a manner familiar to those skilled in the art.

We wish to specifically state, however, that the practice of our invention is not limited to induction and synchronous motors. Any other type of motor, or motor/generator, which can be driven by a single converter to achieve an engine start, by soft-starting or otherwise, is within the scope of our invention.

It should also be understood that it is not necessary to the practice of our invention that all of the starter motors on an aircraft, such as the one shown in FIG. 1, be soft-started. For example, the main engine starter motors 22, 52 on a typical intermediate sized aircraft 10 would typically need to be sized to produce about 30 KW of power for a soft-start. Without soft-starting, the need to withstand inrush currents could increase the required size of the converter 30 and starter motors 22, 52 to as much as 120 KW, thus requiring them to be both physically and electrically much larger. For the main engines 12, 50, therefore, sort-starting offers significant advantages.

The APU starter motor 56 for an intermediate sized aircraft, however, would typically require only about 5 KW of power. Thus a converter 30 designed to produce 30 KW for starting the main engines 12, 50 would easily withstand the inrush currents required to line start a 5 KW APU starter. It may not be desirable, therefore, to include any additional speed sensors or complexity in the converter 30 or the APU starter motor 56 to perform a soft-start of the APU.

SOFT-START USING THE AIR DRIVEN GENERATOR

Figure 3:
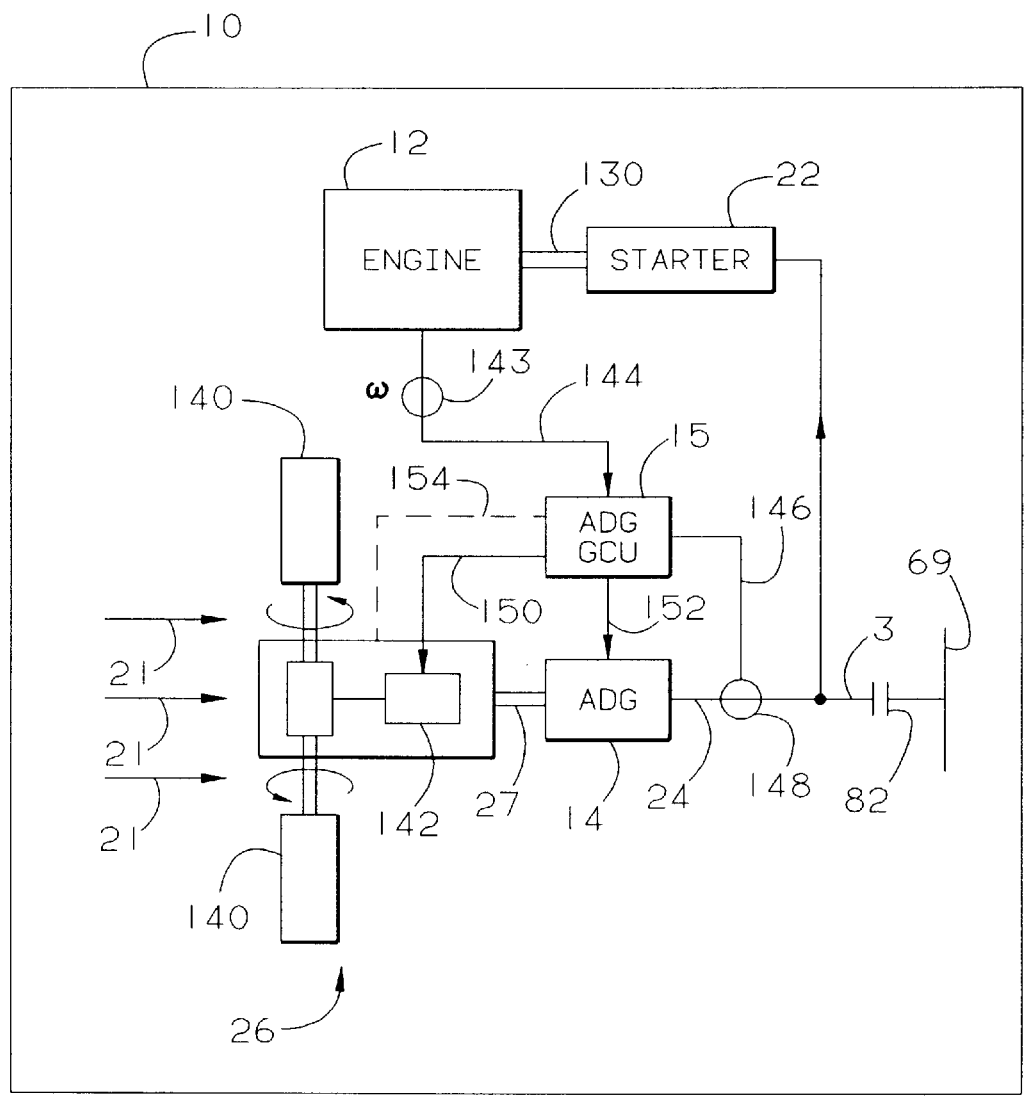
FIG. 3 is a schematic illustration of a portion of the electrical system of FIG. 1 depicting a method for achieving soft-start of an engine by controlling an air driven turbine driving an air driven generator according to our invention.

In a preferred embodiment of our invention, the air driven turbine 26 and air driven generator 14 are controlled by the ADG GCU 15 in a manner allowing soft-starting of the engines 12, 50, 54. Specifically, as shown in FIG. 3, the air driven turbine 26 includes adjustable pitch blades 140, and a pitch control actuator 142 for adjusting the pitch of the blades 140. In the engine start mode, the ADG GCU 15 receives a first signal 144 proportional to rotational speed $\omega$ of the engine 12 to be started, from a resolver 143 or other equivalent sensor disposed to monitor engine speed $\omega$, or speed of the motor rotor 130. The ADG GCU 15 receives a second signal 146 proportional to the output voltage, frequency, and current of the ADG 14, from sensor 148.

Where an induction motor is utilized for the starter motor 22, the ADG GCU 15 generates a first output signal 150 commanding the blade pitch actuator 142 to adjust the pitch of the blades 140 in such a manner that the air 21 passing through the air driven turbine 26 will cause it to drive the air driven generator 14 at sufficient speed to produce an output signal 24 having a frequency equivalent to $\omega+\Delta f$, where $\Delta f$ is the incremental frequency, above the frequency equivalent to $\omega$, that is required to excite the induction motor and cause it to produce accelerating torque. The ADG GCU 15 also sends a second signal 152 to the exciter winding of the air driven generator 14, to cause the generator 14 to produce an output 24 having a constant voltage-to-frequency ratio, so that the motor 22 accelerates the engine 12 in a controlled manner.

Once the engine 12 has reached disconnect speed, as described in a preceding section, the source of the first ADG GCU input 144 may be changed from the engine speed $\omega$ to speed of the air driven turbine 26, as indicated by dashed lines 154 in FIG. 3. The air driven turbine 26 can then be controlled by the ADG GCU 15 to drive the ADG 14 as a traditional RAT or vortex turbine driven generator, producing current at a constant voltage and frequency, of 115/200 VAC 400 HZ for example, for connection to the AC bus 69 through contactor 82.

Through use of controllable pitch blades 140 in the manner described above, our invention thus allows the ADG 14 to soft-start the engines 12, 50, 54 without using the converter 30, when the aircraft 10 is in flight. An air driven turbine 26 having a diameter of about 22 inches will drive an air driven generator 14 rated at about 30 to 45 kva. This size turbine 26 is about the size typically carried by an intermediate sized, 50 seat commercial aircraft, which would require about 40 kw of power from the starter motor 22 for an engine soft-start.

Because the propulsion engines 12, 50 will normally be turning at some speed $\omega$ during flight, the ADG 14 and the ADG GCU 15 need not be sized or designed to start the propulsion engines 12, 50 from rest. Because the APU 54 requires only about 6 kw to start from rest, an ADG sized to produce 40 kw for starting the propulsion engines will easily line or soft-start the APU 54 from rest, thereby precluding the need for any increase in size of the ADG 14, or adding any additional complexity to the start circuit 17 for starting the APU 54 from rest.

As was the case with the converter soft-start described above, the details of how the ADG 14 needs to be controlled to achieve soft-start will depend upon the type of starter motor 22 used, i.e. induction vs. synchronous vs. brushless DC; etc. Regardless of the motor and generator type used, however, those having skill in the art will recognize that the ability to perform a soft-start of an engine, without using an electronic converter, by controlling the pitch of the blades on the air driven turbine is a novel approach to in-flight starting of aircraft engines.

An example of an ADG having a blade pitch control system suitable for use in our invention is provided by U.S. patent application Ser. No. 08/553,180, which is assigned to the assignee of our invention, and incorporated herein by reference.

From the foregoing descriptions, those skilled in the art will readily recognize that the aircraft of our invention overcomes problems encountered in prior attempts to utilize AC start motors for in flight starting of aircraft engines. Specifically, our invention provides an effective and efficient approach to meeting applicable government and military regulations requiring the capacity to making multiple attempts at restarting a propulsion engine while the aircraft is in flight. By utilizing an air driven generator rather than an APU or energy storage means such as an aircraft battery or pressurized gas storage bottle, an aircraft according to our invention is less complex, costly, weighs less, and is more reliable than an aircraft utilizing prior engine start systems.

The aircraft of our invention also provides significant advantage over prior attempts to utilize AC motors for in-flight and on-ground starting of aircraft engines. By providing the means for starting multiple engines with a single converter, the electrical system of our invention provides a practical approach to utilizing AC motors for engine starting as an alternative to prior start systems which utilized air turbine starters. Our invention therefore makes it possible, at last, for aircraft designers to take advantage of the reductions in complicity, cost and weight attendant to the use of AC motors for engine starting.

Those skilled in the art will further recognize that the electric power system 16 of our invention provides not only power from the air driven generator 14 for starting of a propulsion or other engine on board the aircraft, but by virtue of the emergency power contactor 82 also allows the air driven generator 14 to be used to provide emergency power to the AC bus for use by flight control systems or other equipment attached to the AC bus, in the same manner as current ram air turbine emergency power systems. The method taught by our invention of soft-starting a motor, without using an electronic converter, by controlling the pitch of the blades on the air driven turbine can be applied to applications other than engine starting. For example, an air driven generator could be utilized to soft-start a motor driven pump, according to the teachings of our invention.

We also wish to point out that our invention is readily adaptable for integration into new aircraft, and for retrofit into existing aircraft.

Figure 4:
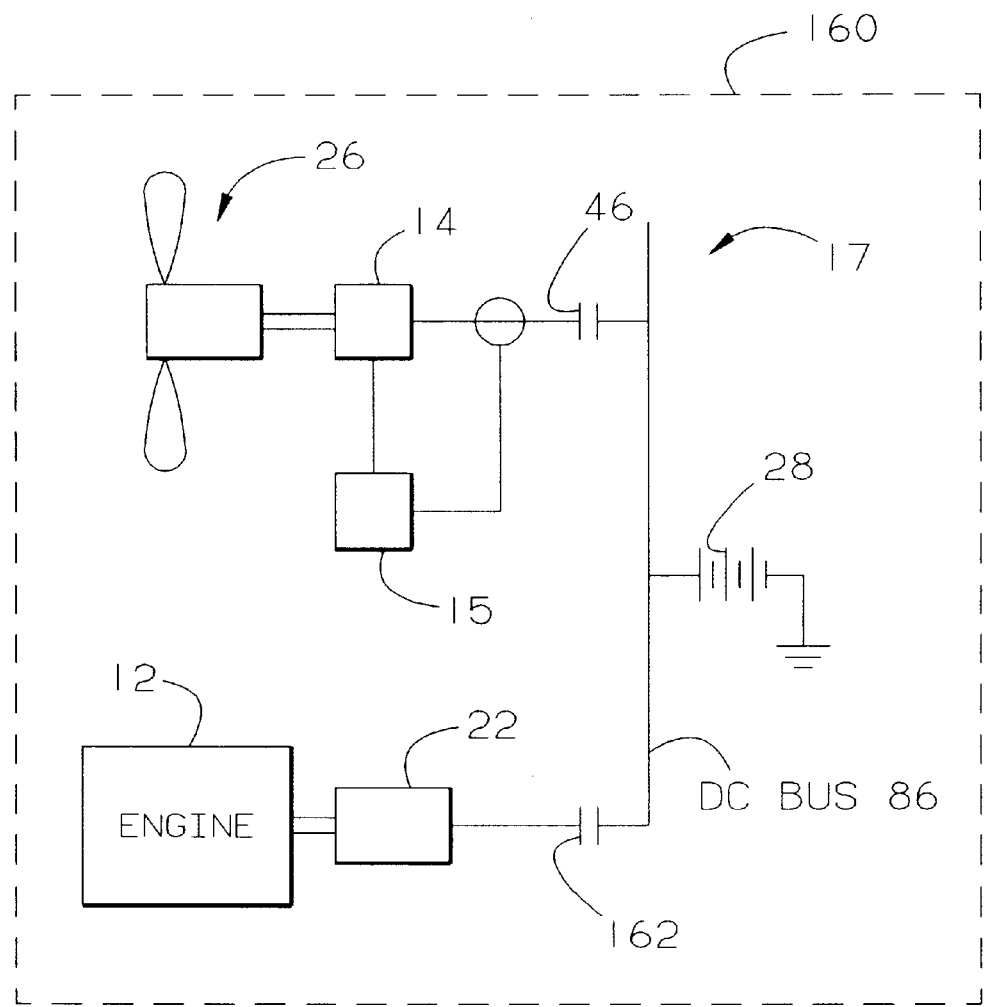
FIG. 4 depicts another embodiment of our invention in the form of an electrical system for a small aircraft.

We wish to emphasize that although we have described our invention herein with respect to certain specific embodiments thereof, many other embodiments and applications of our invention are possible within the scope of our invention as described in the appended claims. For example, as shown in FIG. 4, in a small single engine airplane 160, the engine start-circuit means 17 operably coupling the air driven generator 14 to the starter motor 22 would be much simpler than those described with reference to the multiple engine aircraft depicted in FIGS. 1–3 as described above. In such a simple system, the engine start-circuit means 17 might include only a pair of start contactors 46, 162, a simple voltage-regulator-type ADG GCU 15, and any associated cable or bus means 86 required for electrically connecting the ADG 14 to the starter motor 22 of the engine 12.

Our invention may be practiced with a wide variety of starter motors and air driven turbine configurations. For example, in the small aircraft 160 depicted in FIG. 4, it might be desirable to utilize a DC starter motor 22 and an air driven DC generator 14 rather than the AC motor and AC generator described herein with reference to the exemplary embodiments depicted in FIGS. 1–3. It might also be desirable to utilize an air driven turbine 26 having a traditional mechanical or hydraulic governor for controlling turbine speed, rather than the electrically driven governor described above.

Figure 5:
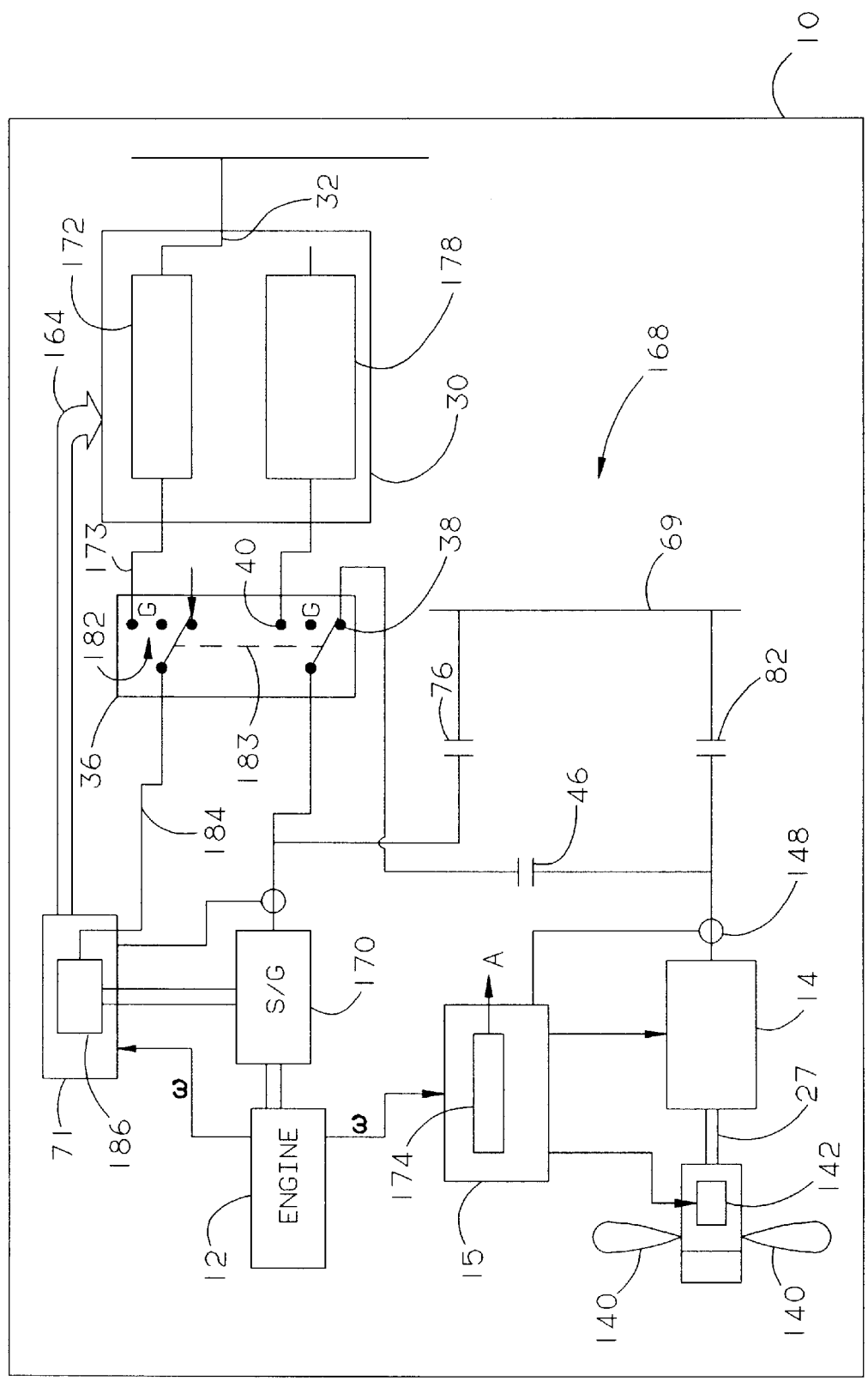
FIG. 5 is a schematic illustration of an aircraft electrical system according to our invention that utilizes a starter/generator in place of the separate starter motor and generators depicted in FIGS. 1–4.

As used herein, the terms "generator" and "motor" encompass those devices known as starter/generators (S/G). Those having skill in the art will recognize, however, that when certain types of self-excited S/G's are used the electrical system would have to include sources of excitation current external to the S/G, in order for the S/G to start from rest. For example, FIG. 5 illustrates a portion of an aircraft electrical system 168 which is similar to the system 16 depicted in FIGS. 1–3, except that functions of the starter 22 and generator 70 of FIGS. 1–3 are combined into a single starter/generator 170. Specifically, FIG. 5 illustrates an S/G of a type commonly known as a brushless, self-excited, synchronous alternator. This type of S/G is particularly desirable for aircraft use in that its simple brushless construction requires little maintenance, and provides long life in a compact lightweight package. A problem arises, however, when this type of device is used as an S/G in that the self-excitation features are only operative when the rotor of the device is turning. For the device to operate as a S/G which must start from a condition wherein the rotor is at rest, i.e. not already turning, some means external to the S/G must be provided for exciting the S/G when its rotor is not turning at sufficient speed to allow self-excitation. It is also generally necessary to provide some means for disabling the self-excitation means when excitation is being provided by the external excitation means.

In the electrical system 168, as shown in FIG. 5, the external excitation means are provided in the converter start mode by adding an exciter inverter 172 to the converter 30. The exciter inverter 172 produces an AC excitation signal 173 in response to commands 164 received from the S/G GCU 73. The external excitation means are provided in the air driven generator start mode by an excitor inverter 174 which is located within and controlled by the ADG GCU 15 to produce an AC excitation signal designated as "A" in FIG. 5.

The start power source selector switch 36 includes an additional set of contacts 182 for selectively connecting either the excitation signal 173 or the excitation signal A, from the exciter inverters 172, 174 respectively located in the converter 30 or the ADG GCU 15, to the S/G GCU 71 via line 184. The additional set of contacts 182 are ganged as shown at 183 to the contacts 46, 38 of the start power source selection switch 36 in such a manner that when the ADG 14 is providing power to the starter motor 22, for instance, the exciter inverter 174 within the ADG GCU 15 will be providing the excitation signal, and such that when the converter 30 is providing power to the starter motor 22 the exciter inverter 172 within the converter 30 will be providing the excitation signal.

The S/G GCU 71 includes means 186 for disabling the self-excitation means (not shown) of the S/G 170, and alternatively connecting the excitation signals 173 or A received via line 184 to excitation windings (not shown) within the S/G 170. The S/G GCU 71 monitors speed ω of the engine 12, or the S/G 170, and commands the means for disabling and connecting 186 to alternatively disable the self-excitation means within the S/G 170 during engine start, and enable the self-excitation means in the generate mode after engine start is achieved.

Specifically, in the start mode below a predetermined speed, the S/G GCU 71 will command that the internal excitation means of the S/G 170 be disabled and excitation be provided via line 184. The start source selector switch 46 will be positioned to provide excitation signals and power for driving the S/G as a motor from either the converter 30, or from the ADG 14 and the ADG GCU 15. The engine start will then proceed as described above with respect to the electrical system 16 depicted in FIGS. 1–3.

Once the engine has started and reached a speed at which power can be extracted, the S/G GCU 71 commands the means for disabling and connecting 186 to disconnect from the line 184 and enable the self-excitation means of the S/G 170. The contacts of the start source selector switch 36 are then opened to the generator (G) position, and the right generator relay 76 is closed to connect the output of the S/G 170 to the AC bus 69. The S/G GCU 71 will then control the S/G 170 in the generate mode to produce output power of a desired frequency and voltage, of for example 115/200 VAC, at 400 HZ.

As was the case with embodiments of our invention utilizing separate motors and generators, the configuration and control of the electrical system depicted in FIG. 5 will vary according to the specific type of S/G 170 utilized, and the personal references of the system designer.

It is understood therefore that the spirit and scope of the appended claims should not be limited to the specific embodiments described and depicted herein.

We claim:

1. An aircraft comprising:
   1) an airframe;
   2) a first propulsion engine attached to said airframe for propelling said aircraft along a flight path;
   3) a first electric starter motor operably coupled to said engine in a manner allowing said motor to spin-up said engine to a start speed whereat said engine can be started while said aircraft is in flight along said flight path;
   4) an air driven electrical generator attached to said airframe in a manner allowing air passing around the airframe when said aircraft is in flight to drive said generator for producing alternating current (AC) electrical power; and
   5) engine start-circuit means operably coupling said generator to said starter motor in such a manner that said electric power produced by said air driven generator may be utilized by said starter motor for driving said engine to allow in-flight starting of said engine.

2. The aircraft of claim 1 wherein said engine start-circuit means includes an emergency start contactor for selectively electrically connecting said air driven generator to said starter motor.

3. The aircraft of claim 1 further including:
  a) a battery;
  b) a start converter having input and output terminals, said input terminal being electrically connected to said battery for receiving DC power therefrom, said converter being configured to convert said DC power into AC power deliverable at said output terminal of said converter; and
  c) wherein said start-circuit means includes a start-power source selection switch having a first input electrically connected to receive electric power from said air driven generator, a second input electrically connected to receive AC power from said output terminal of said start converter, and an output electrically connected to said starter motor;
  d) said start-power source selection switch including switching means for alternatively connecting said output of said selection switch to said first or said second input of said selection switch, to thereby respectively connect said starter motor for receiving electrical power alternatively from said air driven generator or said start converter.

4. The aircraft of claim 3 further comprising:
  an engine driven generator operably connected to be driven by said propulsion engine for producing alternating current;
  AC bus means electrically coupled to said engine driven generator and said air driven generator to selectively receive alternating current from either of said air or engine driven generators.

5. The aircraft of claim 4 wherein said AC bus means includes:
  a generator relay for selectively electrically connecting said engine driven generator to said AC bus means; and
  an emergency start contactor for selectively electrically connecting said air driven generator to said AC bus means.

6. The aircraft of claim 5 further including DC bus means including:
  a) a DC bus;
  b) means for connecting said DC bus to said battery;
  c) a transformer rectifier unit (TRU) having an electrical output connected to said DC bus, and an input adapted to receive alternating current, said TRU being configured for supplying DC power to said DC bus when AC power is supplied to the input of said TRU; and
  d) a TRU relay for selectively electrically connecting said input of said TRU to said AC bus.

7. The aircraft of claim 6 wherein said starter motor and said engine driven generator are embodied in a starter/generator configured to alternatively function as a starter motor for starting said engine, and as a generator for generation of electrical power when driven by said engine.

8. The aircraft of claim 6:
  further including a second engine having operably attached thereto a second starter motor for spin-up of said second engine to a start speed, and a second engine driven generator operably connected to be driven by said second engine for producing alternating current;
  wherein said AC bus means further includes a second generator relay for selectively electrically connecting said second engine driven generator to said AC bus;
  wherein said start-circuit further includes start motor selector means for selectively electrically connecting the output of the start power source selection switch alternately to said first or said second electric starter motor; and wherein said means for connecting said DC bus to said battery is a cross-start contactor.

9. In an aircraft including at least two engines each having operably coupled thereto an electric start motor and an engine driven electric generator, an air driven electrical generator, and a battery, an electric engine start system comprising:
  means for supplying electrical power from said battery for starting at least one of said engines;
  means for supplying electrical power from at least one of said engine driven electrical generators to the electric starter motor of another of the at least two engines for starting same; and
  means for electrically connecting an alternating current (AC) electrical output of said air driven generator to the electric starter motor of at least one of said engines for starting said engine.

10. An aircraft comprising:
  an engine;
  an air driven generator;
  means for operably connecting an electrical output of said air driven generator to said engine for in-flight starting of said engine;
  an air driven turbine having variable pitch blades disposed to intercept a flow of air about said aircraft, and configured to produce a rotary output operably connected to said air driven generator for driving said air driven generator;
  said air driven turbine including blade pitch actuator means for adjusting the rotational speed of said turbine by adjusting the pitch of said blades with respect to said airstream;
  first sensing means for sensing a rotational speed proportional to a speed of said engine and generating a first input signal proportional to said speed;
  second sensing means for sensing a parameter of said electrical output of said air driven generator and generating a second input signal proportional to said parameter;
  control means for receiving said first and second input signals and generating:
    a first control signal applied to said blade pitch actuator means for controlling an output frequency of said electrical output of said air driven generator by controlling said blade pitch and turbine; and
    a second control signal applied to said air driven generator for controlling an output voltage of said electrical output of said air driven generator; and
  wherein said means for operably connecting includes an electric motor operably connected to drive said engine when supplied with said electrical output of said air driven generator in a manner whereby said motor is driven in a soft-start manner for starting said engine.

11. An aircraft including an apparatus, an electric motor operably connected for driving said apparatus, an air driven generator, and means for operably connecting an electrical output of said air driven generator to said motor for driving said apparatus, said aircraft further comprising:
  an air driven turbine having variable pitch blades disposed to intercept a flow of air about said aircraft, and configured to produce a rotary output operably connected to said air driven generator for driving said air driven generator;

said air driven turbine including blade pitch actuator means for adjusting the rotational speed of said turbine by adjusting the pitch of said blades with respect to said airstream;

first sensing means for sensing a rotational speed proportional to a speed of said apparatus and generating a first input signal proportional to said speed;

second sensing means for sensing a parameter of said electrical output of said air driven generator and generating a second input signal proportional to said parameter;

control means for receiving said first and second input signals and generating:
 a first control signal applied to said blade pitch actuator means for controlling an output frequency of said electrical output of said air driven generator by controlling said blade pitch and turbine; and
 a second control signal applied to said air driven generator for controlling an output voltage of said electrical output of said air driven generator;

whereby said electric motor is started in a soft-start manner and drives said apparatus when supplied with said electrical output of said air driven generator.

12. In an aircraft having an engine for propelling said aircraft in flight along a flight path, an electric starter motor operably attached to said engine for driving said engine, and an air driven generator for extracting energy from a flow of air past said aircraft while it is in flight and converting said energy into electrical power, a method for starting said engine while said aircraft is in flight, said method comprising the steps of:

a) electrically connecting said air driven generator to supply alternating current (AC) electrical power to said starter motor for driving said engine;

b) accelerating said engine to a predetermined start-speed;

c) supplying fuel and a source of ignition to said engine while said starter motor is driving said engine at said start-speed.

* * * * *